United States Patent [19]

Kornylo

[11] Patent Number: 5,397,409
[45] Date of Patent: Mar. 14, 1995

[54] METHOD FOR MOLDING A VEHICLE DOOR PANEL

[75] Inventor: Walter P. Kornylo, Livonia, Mich.

[73] Assignee: Atoma International, Inc., Newmarket, Canada

[21] Appl. No.: 52,454

[22] Filed: Apr. 26, 1993

[51] Int. Cl.$^6$ .................... B29C 67/22; B32B 31/16
[52] U.S. Cl. ........................... 156/79; 156/214;
156/245; 156/285; 264/46.8; 264/511
[58] Field of Search ............... 156/285, 214, 79, 245;
264/511, 46.4, 46.6, 46.8

[56] References Cited

U.S. PATENT DOCUMENTS

| | | | |
|---|---|---|---|
| 4,420,447 | 12/1983 | Nakashima | 264/46.8 |
| 4,793,793 | 12/1988 | Swenson et al. | 264/511 |
| 4,810,452 | 3/1989 | Taillefert et al. | 264/46.4 |
| 4,923,539 | 5/1990 | Spengler et al. | 156/285 |

FOREIGN PATENT DOCUMENTS

| | | | |
|---|---|---|---|
| 60-48324 | 3/1985 | Japan | 264/511 |
| 61-297120 | 12/1986 | Japan | 264/511 |
| 62-9942 | 1/1987 | Japan | 264/46.8 |
| 63-176132 | 7/1988 | Japan | 264/511 |

*Primary Examiner*—Michael W. Ball
*Assistant Examiner*—Michele K. Yoder
*Attorney, Agent, or Firm*—Cushman, Darby & Cushman

[57] ABSTRACT

A method of making an interior panel of an automotive vehicle door having an exterior surface which is to face toward the interior of the automotive vehicle when installed therein. An apparatus utilized in the method comprises a mold assembly including a first vacuum mold component having a mold surface shaped to form the exterior surface of an upper section of the door panel, a second non-vacuum mold component cooperable in side-by-side relation with the first vacuum mold component having a mold surface shaped to form the exterior surface of a lower section of the door panel and a third non-vacuum mold component cooperable in opposed relation with the first and second mold components having a mold surface shaped to form the entire opposite surface of the door panel. The method comprises the steps of heating a laminated sheet, and vacuum forming the heated sheet in the first vacuum mold component. Next, a seal is formed along a marginal edge of the vinyl sheet with an elongated sealing surface at a side of the first vacuum mold component which cooperates in side-by-side relation with the second non-vacuum mold component. Thereafter, a substrate is molded and bonded with the vacuum formed laminate sheet to form a panel in which the substrate defines (1) an opposite surface of the panel having a shape corresponding to the mold surface of the third mold component and (2) an exterior surface of the panel having a shape corresponding to the mold surface of the second mold component.

7 Claims, 2 Drawing Sheets

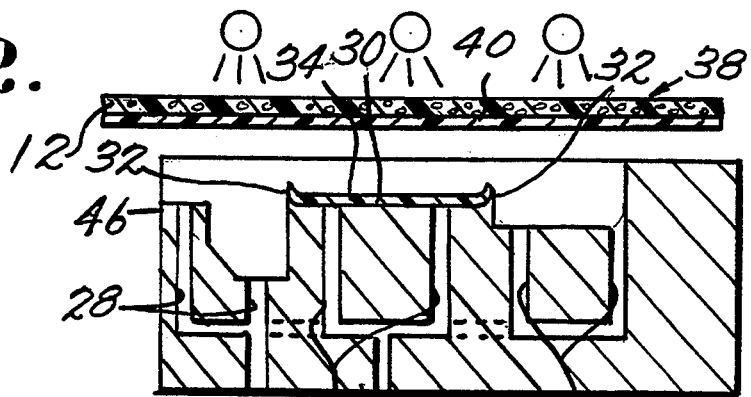
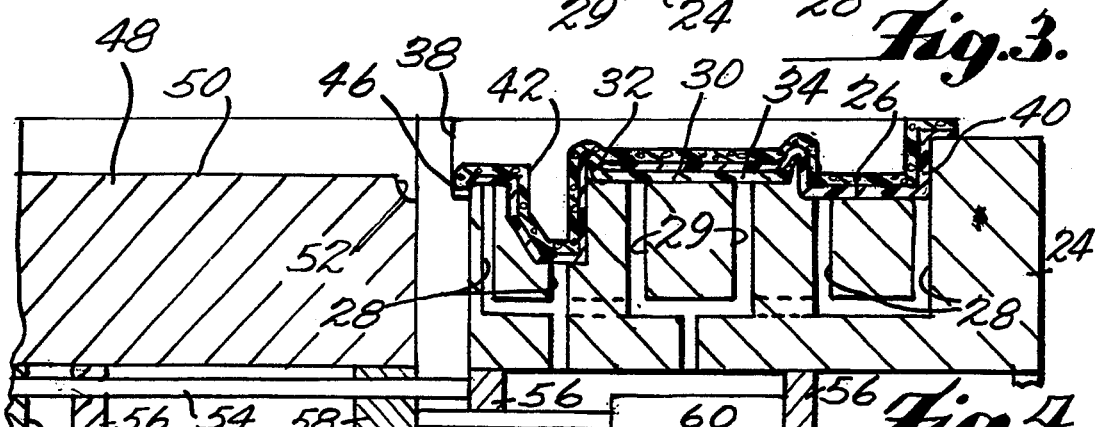
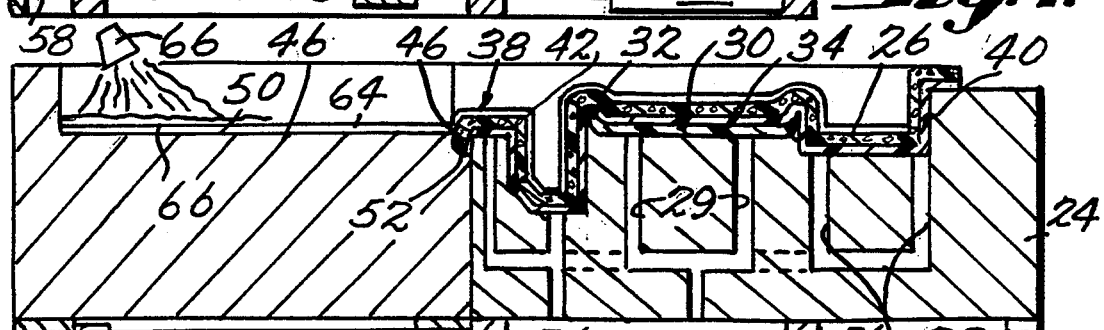
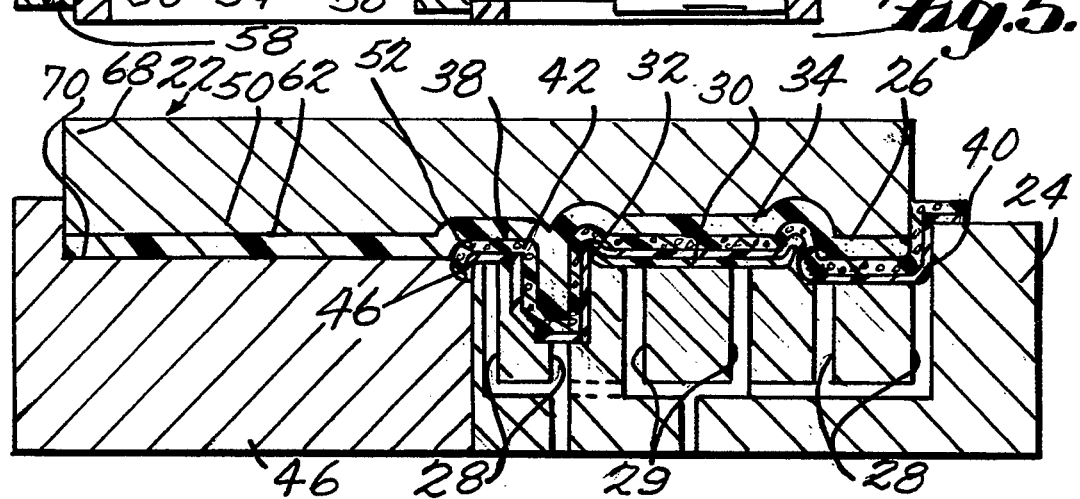

METHOD FOR MOLDING A VEHICLE DOOR PANEL

This invention relates to vehicle door panels and more particularly to improvements in methods for making vehicle door panels relating to the provision of a carpet section on the lower surface thereof which faces the interior of the vehicle when installed therein.

BACKGROUND OF THE INVENTION

There are two different methods for making panels which serve as background for the present invention, both of which result in a somewhat similar panel construction. The difference is that one method is capable of building into the panel more softness by including larger amounts of foamed material. Basically, this softer configuration is used in the more expensive luxury cars, whereas the other method is used basically in the large majority of other vehicles.

The method of making the luxury panel is essentially a two-stage process. In the first stage of the process, a substrate which is in the form of the panel is made by placing a fiberglass reinforcing mat in the lower half of a two-part mold and then filling the lower half of the mold with a foamable material such as liquid polyurethane capable of being cured into a foamed condition. After the foamable material has been inserted into the lower half of the mold, the upper half is moved down and then the foamable material is cured under heat to complete the substrate which is fairly rigid. In the second stage of the process, the substrate molded in the first stage is placed in the upper half of a second two-part mold. The lower part of the mold is in essence a vacuum mold. The second stage procedure is begun by moving a heated sheet of imperforate vinyl over the bottom part of the mold and then drawing by vacuum the heated sheet into the mold so that the three-dimensional configuration is formed on the vinyl. After the vinyl has been moved into engagement with the mold by the vacuum source, an amount of foamable material such as liquid polyurethane is then injected into the mold on top of the vinyl and thereafter the upper part of the mold which contains the substrate is then moved into cooperating relation with the lower part and the foamable material is cured into a relatively soft foamed condition.

The other more economical process is essentially a one-stage process which utilizes a two-part mold, the lower part of which again is a vacuum mold for the vinyl exterior sheet of the door panel to be made. In this case, the vinyl comes as the outer layer of a laminate which includes a layer of foamed material bonded thereto. The laminate is initially heated and then vacuum-drawn into the lower part of the mold. Next, a mat of fiberglass or similar reinforcing is placed inside the laminate vacuum adhered to the lower mold and, thereafter, a liquid polyurethane is added to the lower mold part over the vacuum-held laminate. The upper mold part is then closed and essentially a relatively rigid substrate is molded integrally with the vinyl laminate. In this process, it is not possible to provide much thickness and softness in the foam that is laminated with the vinyl or at least not as much as can be used in the second step of the two step process.

It is the usual practice to complete the final door panel molded in the mold assembly by thereafter adhering a carpet section to the lower planar exterior surface thereof. In the case of the two stage process, it has been a relatively simple matter to form the vacuum mold which receives the vinyl as a half mold in which the heated vinyl fills the mold and has its edges extending from the periphery of the mold surface along four sides and to mate this half mold with a full upper mold carrying a full substrate. In this way, it becomes possible to mold the short foamed polyurethane between the upper half of the substrate and the heated vinyl interfacing with the half mold. The resultant panel thus presented the lower half of the substrate without vinyl so that the carpet section could be added to complete the panel. Panels resulting from this modification of the basic two stage process have been used commercially for well over a year. The construction of the panel included a full relatively rigid substrate forming the entire interior surface of the panel, a carpet section adhered to the lower exterior surface of the substrate and an uneven thickness of foamed material bonded to the upper exterior surface of the substrate with vinyl material bonded to the uneven foamed material. To date, however, a comparable construction has never been made utilizing the more economical one stage method because of the necessity to provide full molds to mold a full substrate. Nevertheless, it is recognized that, if the vinyl and uniform layer of foamed material between the substrate and the carpet section could be eliminated in practicing the one stage method in a cost effective manner, the resultant product would likewise be more cost effective.

SUMMARY OF THE INVENTION

An object of the present invention is to provide a one stage method for producing door panels of the type described in a more cost effective manner. Moreover, the method procedures required to eliminate the lower portion of the laminated vinyl sheet from the finished panel are such that a substantial part of the savings in material costs can be retained. This reduction in material costs can be particularly desirable in providing doors in which the normal carpet section is relatively large as, for example, in minivan vehicles.

In accordance with the principles of the present invention, the aforesaid cost effectiveness can be achieved by providing a method of making an interior panel of an automotive vehicle door having an exterior surface which is to face toward the interior of the automotive vehicle when installed therein. The method utilizes a mold assembly including cooperating opposed mold components having opposed mold surfaces shaped to form the exterior surface of the panel, and an opposed surface thereof, the mold component with the mold surface shaped to form the exterior surface of the panel being a vacuum mold component having a mold surface arm rest portion defining an upwardly facing arm rest portion of the panel. The method comprises the steps of heating a laminate sheet comprising (1) an outer layer of vinyl sheet and (2) a layer of relatively soft foamed material bonded thereto, and vacuum forming the heated laminate sheet in the vacuum mold component oriented so that an arm rest portion of the laminate sheet is the vinyl sheet surface thereof engaged with the mold surface arm rest portion. Next, a preformed pad of foamed elastomeric material having a density in the range of 30 to 45 pounds per cubic foot is mounted on the opposite surface of the arm rest portion of the heated laminate sheet. After a reinforcing mat has been placed over the mold surface defining the exterior surface of the panel and the heated laminate sheet, a foamable polyurethane material is added onto the reinforcing mat. Thereafter, the foamable polyurethane material is heated and cured while all of the mold components are in cooperating relation so as to form a panel which includes (1) a substrate defining the opposite surface thereof, (2) an upwardly facing arm rest portion defined on its exterior surface by the vinyl sheet and backed up therebelow by the layer of relatively soft foamed material and the pad of foamed elastomeric material.

Another object of the present invention is to provide an improved molding apparatus for carrying out the method described above. In accordance with the principles of the present invention, this objective is obtained by providing an apparatus for making an interior panel of an automotive vehicle door having an exterior surface which is to face toward the interior of the automotive vehicle when installed therein. The apparatus comprises a mold assembly including a first vacuum mold component having a mold surface shaped to form the exterior surface of an upper section of the door panel adapted to receive a heated moldable sheet of a size to cooperate with the mold surface thereof, and to vacuum form the heated moldable sheet to the mold surface thereof. A second non-vacuum mold component is cooperable in side by side relation with the first vacuum mold component having a mold surface shaped to form the exterior surface of a lower section of the door panel. A sealing mechanism forms a seal along a marginal edge of the moldable sheet with an elongated sealing surface at a side of the first vacuum mold component which cooperates in side-by-side relation with the second non-vacuum mold component. A third mold component is provided which has a mold surface shaped to form an interior surface of the panel opposite from the exterior surface thereof including upper and lower portions cooperatively spaced in opposed relation from the mold surfaces of the cooperating side-by-side first and second mold components shaped to form the upper and lower portions of the exterior surface of the door panel for enabling a relatively rigid substrate to be molded between the spaced mold surfaces after a reinforcing mat and foamable material have been added therebetween.

Still another object of the present invention is the provision of an improved door panel made by the method and apparatus of the present invention. In accordance with the principles of the present invention, this objective is achieved by providing a vehicle door panel comprising a relatively rigid molded substrate extending throughout the panel and having an interior surface constituting the interior surface of the panel which faces away from the interior of the vehicle when the panel is installed therein. The substrate includes an upper window sill portion, an intermediate portion, and a lower generally planar portion. A plurality of layers of material are molded to the upper and intermediate portions of the substrate on an exterior surface thereof opposite from the interior surface thereof. The plurality of layers includes an outer layer of vinyl sheet having an exterior surface facing in a direction toward the interior of the vehicle when the panel is installed therein and an opposite interior surface, and a layer of relatively soft foamed material of uniform thickness bonded to the opposite interior surface of the vinyl sheet. A carpet section having an interior backing surface and an exterior nap surface, the carpet section being secured to the lower portion of the substrate with the interior backing surface thereof abutting the exterior surface of the lower portion of the substrate and the nap surface defining the exterior surface of a lower portion of the panel corresponding with the lower portion of the substrate.

BRIEF DESCRIPTION OF THE DRAWINGS

FIG. 2 is a sectional view of a first vacuum mold component showing a step in the method according to the present invention;

FIG. 3 is a sectional view similar to FIG. 2 showing the completion of the vacuum forming step of the method with a second non-vacuum mold component in an inoperative position with respect to the first vacuum mold component;

FIG. 4 is a sectional view similar to FIG. 3 showing the second mold component in an operative position and the start of the substrate forming step of the method; and FIG. 5 is a sectional view of the mold assembly including the first and second mold components shown in FIGS. 3 and 4 showing the completion of the substrate forming step of the method.

DESCRIPTION OF THE PREFERRED EMBODIMENT

Figure 1:
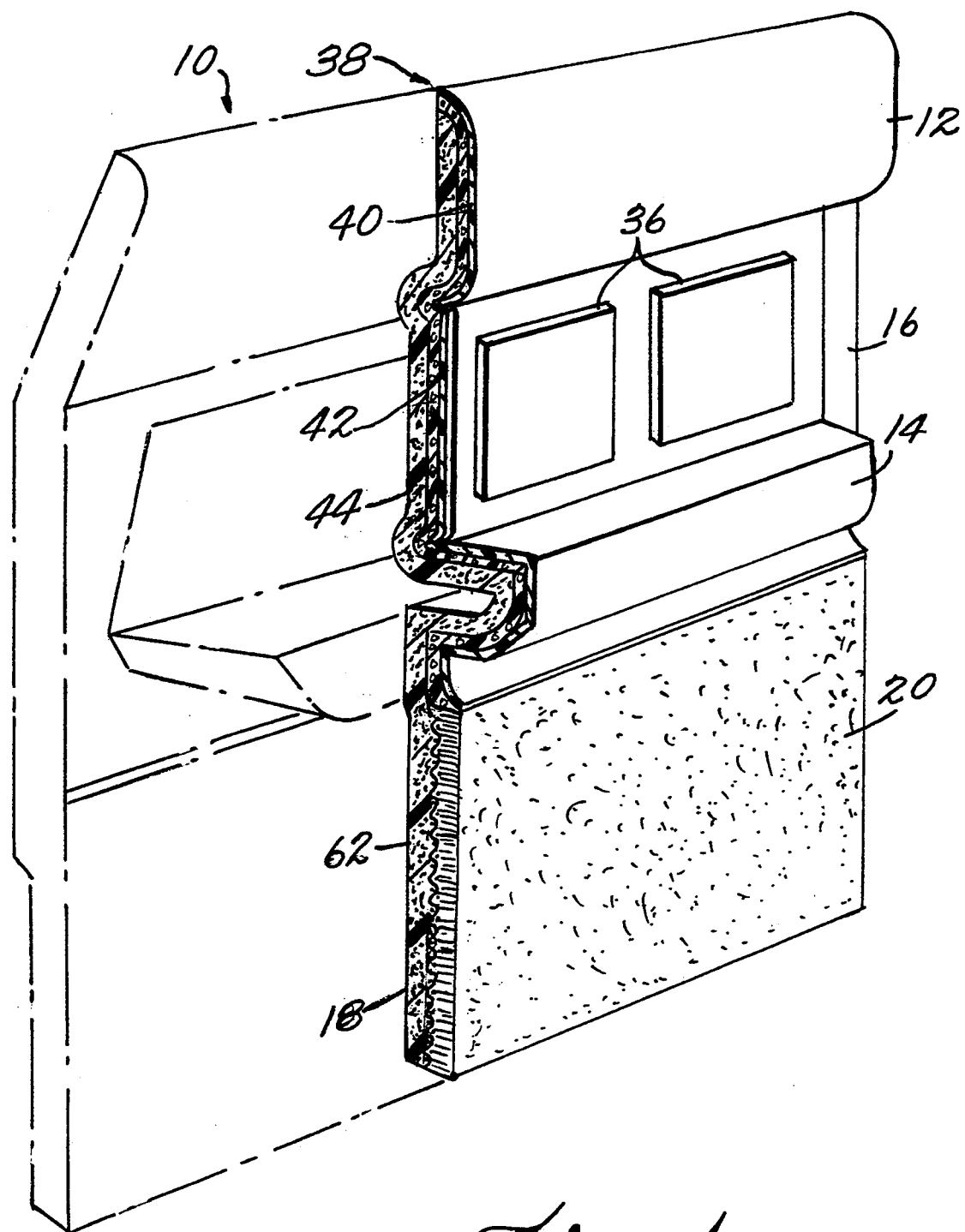
FIG. 1 is a perspective view of a completed vehicle door panel constructed in accordance with the present invention.

Referring now more particularly to the drawings, there is shown in FIG. 1 a vehicle door panel, generally indicated at 10, made by a method according to the principles of the present invention. The door panel 10 includes a window sill upper portion 12 and an arm rest portion 14 defining therebetween a bolster receiving portion 16. A lower planar rug receiving portion 18 having a rug section 20 adhered thereto is disposed below the arm rest portion 14.

The method utilizes a mold assembly, generally indicated at 22. The mold assembly 22 includes a first lower mold part or component 24, which is a vacuum forming mold component having a mold surface 26 and two sets of vacuum openings 28 and 29 extending from the mold surface 26 to two sources of vacuum (not shown). The mold surface 26 includes a portion, indicated at 30, which is positioned to form the bolster receiving portion 16 of the panel 10. The preferred method of the present invention utilizes the bolster providing steps disclosed in my commonly assigned concurrently filed U.S. patent application Ser. No. 08/052,453, Docket 90, the disclosure of which is hereby incorporated by reference into the present specification. The present method is more concerned with the formation of the lower portion 18 of the panel 10 which receives the carpet section 20 and hence in its broadest aspects contemplates the formation of a door panel 10 without a bolster or a door panel having a bolster provided by other known process steps.

The bolster receiving portion 30 is defined by a thin projecting peripheral lip 32. FIG. 2 illustrates the first step in the present method and, in this initial step in accordance with the aforesaid application, a bolster laminate 34 is initially prepared for mounting on the portion 30 of the mold surface 26 defined by the peripheral lip 32. The bolster laminate 34 includes a textile outer layer. The textile outer layer may be of any suitable configuration and material as, for example, a knitted, woven, non-woven or otherwise formed textile fabric made from monofilaments and/or staple filaments of one textile material or of different textile materials including synthetic and natural materials such as cotton, wool, silk, linen, polyester, nylon, rayon, polyethylene, polypropylene, vinyl, and blends and mixtures thereof. In a preferred embodiment of the present invention, the textile layer is formed of a synthetic thermoplastic material, as for, example, polyester and the mold surface portion 30 has an appropriate design, such as the embossed squares 36, provided therein which can be imparted by molding under heat and pressure to the textile outer layer of thermoplastic material of the bolster laminate 34.

The bolster laminate 34 also includes a film formed of polyurethane material which provides a flexible imperforate layer and an inner surface which becomes tacky when heated. If desired, the bolster laminate 34 may also include an intermediate layer which preferably is of a foamed material. The foamed material is preferably relatively soft and may be of polypropylene, polyethylene, polyvinyl chloride, polyurethane or the like. Here again, a preferred material is polyurethane.

In the embodiment shown in FIG. 1, there is only a single unitary bolster laminate 34 utilized. However, it will be understood that more than one bolster laminate 34 may be utilized and may be positioned in the exterior surface of the door panel 10 in areas other than the bolster receiving portion 16 previously described.

As shown in FIG. 2, the first step in the process is to mount the bolster laminate 34 in the bolster receiving portion 30 of the mold surface 26 of the vacuum mold part 24. The bolster laminate 34 is mounted so that the outer textile surface engages the mold surface portion 30 and a marginal edge portion of the bolster laminate 34 extends along the inwardly facing surface of the peripheral lip 32.

Next, a laminated sheet, generally indicated at 38, is provided which has a surface area sufficient to cover the mold surface 26 which turns upwardly along its periphery. A typical thickness for the laminated sheet 38 is 3½ millimeters.

The laminated sheet 38 includes a vinyl sheet 40 as an outer layer thereof. A layer of relatively soft foam material 42 is laminated to the inner surface of the vinyl sheet 40. The soft foam of the intermediate layer 42 may be provided by many different materials as, for example, polypropylene, polyethylene, polyester, polyvinyl chloride, and polyurethane. A preferred embodiment is polyurethane.

The laminated sheet 38 is heated to a temperature within the range of 300° to 340° F. and then vacuum formed onto the mold surface 26 and the inner layer of the bolster laminate 34 to intimately bond with the latter. FIG. 3 illustrates the condition of the laminate sheet 38 after the vacuum forming step has been completed.

In accordance with the principles of the present invention, the next step in the present method is the formation of a seal along a marginal edge of the heated laminated sheet 38 and specifically the vinyl sheet 40 with an elongated sealing surface 46 on the side of the first mold component 24 which is adapted to be mounted in cooperating side-by-side relation with respect to a second lower non-vacuum mold component 48 of the mold assembly 22. The second mold component 48 includes a mold surface 50 which is shaped to form the exterior surface of the lower planar portion 18 of the panel 10 prior to the adherence of the rug section 20 thereto. The second mold component 48 also includes a marginal edge engaging surface 52 which is used to effect and retain the seal between the marginal edge portion of the vinyl sheet 40 and the elongated sealing surface 46.

In the preferred embodiment shown, the seal is effected by effecting a relative movement between the first and second mold components 24 and 48 from an inoperative position wherein the marginal edge engaging surface 52 and sealing surface 46 are spaced apart, as shown in FIG. 3 so as to allow the marginal edge portion of the heated laminated sheet 38 to be positioned therebetween, as shown in FIG. 3, into an operative position, as shown in FIG. 4, wherein the marginal edge engaging surface 52 of the second mold component 48 engages the marginal edge portion of the laminated sheet 38 and retains the vinyl sheet 40 in sealing relation with the sealing surface 46.

Preferably as shown, the relative movement is effected by mounting the second mold component 48 for rectilinear movement toward and away from a stationary first mold component 24 although either or both could be moved. Any suitable mounting means may be provided, the structure shown being somewhat schematic and including rails 54 on fixed supports 56 and runners 58 fixed to mold component 48 slidable on the rails 54 with a piston and cylinder unit 60 being connected between the supports 56 and the runners 58.

In its broadest aspects, the present invention contemplates other arrangements for effecting the seal other than the preferred arrangement shown. For example, it would be possible to make the first and second components 24 and 48 as a unitary structure and provide an elongated groove in the combined mold surfaces 26 and 50 between the vacuum portion and the non-vacuum portion thereof. The groove would be of a size to receive the marginal edge portion of the laminated sheet 38 therein and would provide a sealing surface similar to the sealing surface 46. An elongated groove filling element could be mounted for movement toward and away from the groove between an inoperative position allowing insertion of the marginal edge portion and an operative position clamping the marginal edge portion within the groove against the sealing surface.

FIG. 4 and FIG. 5 illustrate the next steps in the present method. The next steps of the method are steps which are taken to essentially mold a substrate 62 onto the exposed surface of the foam material layer 42 which is vacuum formed onto the lower mold part 24. FIG. 4 shows the preferred steps of forming the substrate 62 which includes the initial mounting of a fiberglass reinforcing mat 64 over the film surface and then adding a foamable material 66, preferably foamable polyurethane liquid as indicated schematically at 66 in FIG. 4.

Once the polyurethane foamable material 66 has been added within the mold components 24 and 48, a cooperating mold part or component 68 of the mold assembly 22 is moved into cooperating relation with the side-by-side arranged lower vacuum mold component 24 and second mold component 48. The mold component 48 has a mold surface 70 which is shaped to define the interior surface of the panel 10. Thereafter, the foamable polyurethane material is foamed and cured under heat within the range of 100°–160° F. The curing results in a relatively rigid substrate 62 of foamed polyurethane with the fiberglass reinforcing mat embedded therein.

It can be seen that the resultant panel 10 which is removed from the mold assembly 22 has a lower portion 18 which is defined exteriorly by the exterior surface of the substrate 62. Thereafter, the rug section 20 is suitably adhered to the exterior surface of the substrate 62 as by an adhesive or the like. As best shown in FIG. 1, the backing surface of the rug section 20 is suitably adhered to the lower portion of the substrate 62 so that the nap surface of the rug section 20 defines the exterior surface of the lower portion of the panel 10.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A method of making an interior panel of an automotive vehicle door having an exterior surface which is to face toward the interior of the automotive vehicle when installed therein, said method utilizing a mold assembly including a first vacuum mold component having a mold surface shaped to form the exterior surface of an upper section of the door panel, a second non-vacuum mold component cooperable in side by side relation with said first vacuum mold component having a mold surface shaped to form the exterior surface of a lower section of the door panel and a third non-vacuum mold component cooperable in opposed relation with said first and second mold components having a mold surface shaped to form the entire opposite surface of said door panel, said method comprising the steps of:

heating a laminated sheet of a size to cooperate with the mold surface of said first vacuum mold component which laminated sheet comprises (1) an outer layer of vinyl sheet and (2) a layer of relatively soft foamed material bonded thereto, vacuum forming said heated laminate sheet in said first vacuum mold component oriented so that the outer surface of said outer layer of vinyl sheet faces toward the mold surface thereof, forming a seal along a marginal edge of said vinyl sheet with an elongated sealing surface at a side of the first vacuum mold component which cooperates in side-by-side relation with the second non-vacuum mold component, placing a reinforcing mat over the vacuum formed heated sheet and the mold surface of the cooperatively side-by-side related second non-vacuum mold component, adding a foamable polyurethane material to the reinforcing mat in such a way that the seal formed along the edge of the vinyl sheet prevents the foamable material added to the portion of the reinforcing mat overlying the mold surface of the second non-vacuum mold component from entering between the mold surface of the first vacuum mold component and the outer layer of vinyl sheet facing toward the same, heating and curing the foamable polyurethane material with said third mold component in opposed cooperating relation with said first and second mold components so as to form a unitary door panel which includes a substrate moldingly bonded with said vacuum formed laminated sheet in which the substrate defines (1) an opposite surface of the unitary panel having a shape corresponding to the mold surface of said third mold component and (2) an exterior surface of the unitary panel having a shape corresponding to the mold surface of said second mold component, and adhering a decorative textile panel to the exterior surface of the substrate of said unitary panel.

2. A method as defined in claim 1 wherein the seal of the marginal edge of said vinyl sheet with said elongated sealing surface is formed by moving an elongated marginal edge engaging surface on said second mold component from an inoperative position wherein the marginal edge engaging surface thereof is spaced from said sealing surface a distance sufficient to allow the marginal edge of the vinyl sheet to be positioned therebetween into an operative position wherein the marginal edge engaging surface retains said marginal edge in sealing relation with said sealing surface.

3. A method as defined in claim 1 including the step of forming a bolster laminate including a textile outer layer, a flexible imperforate layer and an inner surface of a material which becomes tacky when heated and mounting the bolster laminate in a portion of the mold surface of the first vacuum mold component prior to the vacuum forming of said heated laminated sheet so that during the vacuum forming step the vinyl sheet surface bondingly interengages the tacky material of the film inner layer of the bolster laminate.

4. A method as defined in claim 3 wherein said bolster laminate means comprises a single unitary bolster laminate, the mold surface of said first vacuum mold component including a window sill portion defining the exterior of an upper window sill portion of the door panel, an arm rest portion spaced from said window sill portion defining the exterior surface of an arm rest portion of said door panel, the portion engaged by the textile outer layer of said bolster laminate being disposed between said window sill portion and said arm rest portion.

5. A method as defined in claim 4 wherein the portion of the mold surface of said first vacuum mold component on which said bolster laminate is mounted comprises a surface area bounded by a thin projecting peripheral lip having an interior surface extending from said surface area and an exterior surface from which the remaining mold surface extends, said bolster laminate being mounted on said mold surface area so that a marginal edge portion thereof lies along the interior surface of said peripheral lip, the vinyl sheet surface engaging the exterior surface of said lip being biased by the relatively soft foamed material to abuttingly engage the marginal peripheral edge portion of said bolster laminate when removed from engagement with said lip after the molding procedure has been completed.

6. A method as defined in claim 5 wherein the textile outer layer of said bolster laminate is made of thermoplastic material, the surface area bounded by said lip including a non-planar surface design which is imparted to the engaged surface of textile outer layer of said bolster laminate and retained therein by virtue of the thermoplastic nature of the material thereof.

7. A method as defined in claim 3 wherein said bolster laminate means includes a layer of foamed thermoplastic material bonded to said outer layer.

* * * * *